US010324710B2

(12) United States Patent
Shani et al.

(10) Patent No.: US 10,324,710 B2
(45) Date of Patent: Jun. 18, 2019

(54) INDICATING A TRAIT OF A CONTINUOUS DELIVERY PIPELINE

(71) Applicant: HEWLETT PACKARD ENTERPRISE DEVELOPMENT LP, Houston, TX (US)

(72) Inventors: Inbar Shani, Yehud (IL); Lior Reuven, Yehud (IL); Amichai Nitsan, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 52 days.

(21) Appl. No.: 15/032,650

(22) PCT Filed: Nov. 15, 2013

(86) PCT No.: PCT/US2013/070308
§ 371 (c)(1),
(2) Date: Apr. 28, 2016

(87) PCT Pub. No.: WO2015/073025
PCT Pub. Date: May 21, 2015

(65) Prior Publication Data
US 2016/0253172 A1 Sep. 1, 2016

(51) Int. Cl.
G06F 8/70 (2018.01)
G06Q 10/06 (2012.01)
G06F 8/30 (2018.01)
G06F 9/445 (2018.01)

(52) U.S. Cl.
CPC .............. G06F 8/70 (2013.01); G06Q 10/06 (2013.01); G06Q 10/06393 (2013.01); G06F 8/30 (2013.01); G06F 9/44505 (2013.01)

(58) Field of Classification Search
CPC .................... G06F 8/70–77; G06Q 10/06–067
See application file for complete search history.

(56) References Cited

U.S. PATENT DOCUMENTS

| 5,751,945 | A | 5/1998 | Levine et al. | |
| 8,645,906 | B2 * | 2/2014 | Jain | G06F 8/70 717/101 |
| 8,819,617 | B1 * | 8/2014 | Koenig | G06F 11/3664 717/101 |
| 8,938,708 | B2 * | 1/2015 | DeLuca | G06Q 10/06398 717/101 |
| 9,448,787 | B2 * | 9/2016 | Rosomoff | G06F 8/70 |
| 9,658,939 | B2 * | 5/2017 | Novak | G06F 11/3668 |

(Continued)

OTHER PUBLICATIONS

Neely et al., Continuous Delivery? Easy! Just Change Everything (well, maybe it is not that easy), published by IEEE 2013 Agile Conference, pp. 121-128 (Year: 2013).*

(Continued)

Primary Examiner — Thuy Dao
Assistant Examiner — Zheng Wei

(57) ABSTRACT

Examples disclosed herein relate to indicating a trait of a continuous delivery pipeline. Examples include accessing, for each of a plurality of continuous delivery (CD) pipelines, respective pipeline characteristics previously collected by a collection engine of a CD server for at least one of the CD pipelines, and indicating a trait of the pipeline characteristics of at least one of the CD pipelines.

17 Claims, 3 Drawing Sheets

(56) References Cited

U.S. PATENT DOCUMENTS

| | | | | |
|---|---|---|---|---|
| 2004/0260595 | A1* | 12/2004 | Chessell | G06F 11/0748 |
| | | | | 714/47.2 |
| 2006/0059460 | A1* | 3/2006 | Phillips | G06F 8/70 |
| | | | | 717/109 |
| 2006/0123389 | A1* | 6/2006 | Kolawa | G06F 11/3616 |
| | | | | 717/101 |
| 2006/0129338 | A1 | 6/2006 | Turley et al. | |
| 2006/0168564 | A1 | 7/2006 | Zhang et al. | |
| 2007/0226679 | A1 | 9/2007 | Jayamohan et al. | |
| 2008/0066049 | A1* | 3/2008 | Jain | G06F 8/70 |
| | | | | 717/101 |
| 2008/0133293 | A1* | 6/2008 | Gordon | G06Q 10/06 |
| | | | | 705/1.1 |
| 2008/0141002 | A1 | 6/2008 | Bhargava et al. | |
| 2009/0282227 | A1 | 11/2009 | Hoover et al. | |
| 2010/0269087 | A1* | 10/2010 | Kabra | G06F 8/71 |
| | | | | 717/101 |
| 2012/0174071 | A1* | 7/2012 | Kannan | G06F 8/77 |
| | | | | 717/124 |
| 2014/0053125 | A1* | 2/2014 | DeLuca | G06Q 10/06398 |
| | | | | 717/101 |
| 2014/0068554 | A1* | 3/2014 | Novak | G06F 11/3668 |
| | | | | 717/110 |
| 2014/0257918 | A1* | 9/2014 | Spencer | G06Q 10/0635 |
| | | | | 705/7.28 |
| 2014/0282355 | A1* | 9/2014 | Berry | G06F 8/70 |
| | | | | 717/101 |
| 2014/0317591 | A1* | 10/2014 | Rosomoff | G06F 8/70 |
| | | | | 717/101 |
| 2014/0365991 | A1* | 12/2014 | Bhardwaj | G06F 8/70 |
| | | | | 717/102 |
| 2015/0026660 | A1* | 1/2015 | Vaidyanathan | G06F 8/70 |
| | | | | 717/110 |
| 2017/0052880 | A1* | 2/2017 | Rosomoff | G06F 8/70 |

OTHER PUBLICATIONS

Martin Fowler, Continuous Integration, published 2006, pp. 1-14, [retrieved online on Mar. 20, 2019 from <http://martinfowler.com/articles/continuousIntegration.html>] (Year: 2006).*

Azoff, M. et al., Software Lifecycle Management 2011/2012, (Research Paper), Jun. 2011, 32 pages.

Benoit Delbosc, "[Monday Dev Heaven] Continuous Integration at Nuxeo," Nuxeo Blogs , , pp. 1-4, <http://www.nuxeo.com/blog/development/2012/02/optimize-continuous-integration/>.

Bossert et al., "PerfPublisher Plugin," Jenkins Wiki, Aug. 5, 2013, 6 pages <https://wiki.jenkins-ci.org/display/JENKINS/PerfPublisher+Plugin>.

Camblor et al., "Global Build Stats Plugin," Jenkins Wiki, Aug. 9, 2013, 10 pages <https://wiki.jenkins-ci.org/display/JENKINS/Global+Build+Stats+Plugin>.

Evernat-, "Monitoring," Jenkins Wiki, Sep. 29, 2013, 7 pages. <https://wiki.jenkins-ci.org/display/JENKINS/Monitoring>.

Humble et al., Continuous Delivery, 2010, Addison-Wesley, 123 pages. <http://dev.twomorrowstech.com/Continuous%20Delivery%20-%20Jez%20Humble.pdf>.

International Search Report & Written Opinion received in PCT Application No. PCT/US2013/070308, dated Aug. 29, 2014, 10 pages.

James Betteley, "Continuous Delivery Using Build Pipelines With Jenkins and Ant," 2011, pp. 1-6. <http://www.methodsandtools.com/archive/archive.php?id=121>.

Robert Daniel Moore, "Maintainable TeamCity continuous deployment pipeline configuration," Sep. 1, 2012-Jul. 31, 2013, 21 pages <http://robdmoore.id.au/blog/2012/09/01/maintainable-teamcity-continuous-deployment-pipeline-configuration/>.

Travis CI GMBH, "Getting Started," Travis CI Overview, retrieved Oct. 17, 2013, 9 pages, retrieved from: <http://about.travis-ci.org/docs/user/getting-started/>.

Wikipedia "Cluster analysis," Oct. 22, 2013, 17 pages. <http://en.wikipedia.org/wiki/Cluster_analysis>.

* cited by examiner

INDICATING A TRAIT OF A CONTINUOUS DELIVERY PIPELINE

CROSS-REFERENCE TO RELATED APPLICATION

This application is a U.S. National Stage Application of and claims priority to International Patent Application No. PCT/US2013/070308, filed on Nov. 15, 2013, and entitled "INDICATING A TRAIT OF A CONTINUOUS DELIVERY PIPELINE," the entire content of which is hereby incorporated in its entirety.

BACKGROUND

Continuous delivery (or "continuous deployment") (CD) is a practice that may be utilized to automate various aspects of the development lifecycle of a computer application, such as building code into deliverable assemblies, performing unit testing on the assemblies, deploying the assemblies into a computing environment, and performing testing on the deployed assemblies. In some examples, a CD pipeline may be utilized to automate the performance of these processes for a particular computer application.

BRIEF DESCRIPTION OF THE DRAWINGS

The following detailed description references the drawings, wherein.

DETAILED DESCRIPTION

Figure 1:
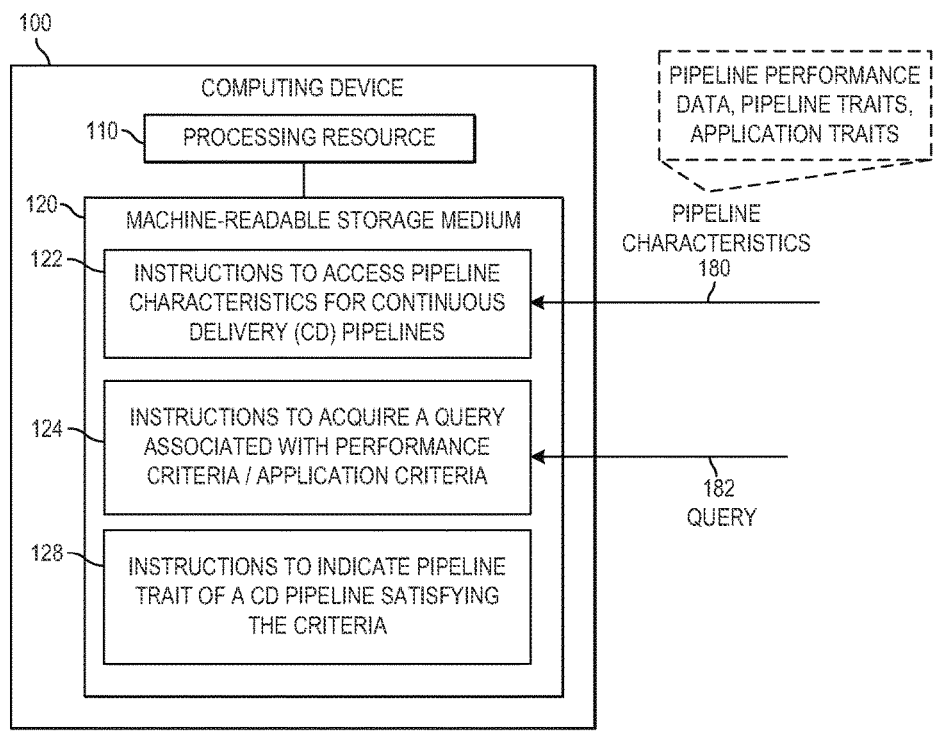
FIG. 1 is a block diagram of an example computing device to identify pipeline trait(s) of a continuous delivery (CD) pipeline satisfying query criteria.

In examples described herein, a CD pipeline may be a definition of a connected sequence of development lifecycle processes that may be performed for a computer application. Example development lifecycle processes that may be included in the connected sequence defined by a CD pipeline may include respective processes to, for example, retrieve code changes from a specified source configuration management (SCM) tool, build executable assemblies, perform unit testing on those assemblies, or a combination thereof. In some examples, the practice of automating such processes may be referred to as continuous integration (CI). As used herein, "continuous delivery" ("CD") may include continuous integration, or any portion or aspect thereof. In examples described herein, a CD pipeline may include any process(es) that may be considered part of a continuous integration practice.

Other example development lifecycle processes that may be included in the connected sequence defined by a CD pipeline may include respective processes to, for example, deploy assemblies into a computing environment, execute testing (e.g., application programming interface (API) testing, functional testing, performance testing, etc.), deploy the assemblies into a production environment, or a combination thereof. In some examples, the practice of automating such processes may be referred to as continuous delivery or continuous deployment. In examples described herein, a CD pipeline may comprise any combination of development lifecycle processes described herein.

CD pipelines may be defined differently for different computer applications, different services, different delivery schedules for an application or service, and the like. However, it may be difficult to determine good CD pipeline definition for a given computer application, service, or delivery schedule. In some cases, when defining a new CD pipeline for a computer application, for example, a user may copy the way a CD pipeline was defined for another computer application, which may lead to poor performance, results, or the like.

To address these issues, examples described herein may access pipeline characteristics for each of a plurality of continuous delivery (CD) pipelines, the pipeline characteristics including respective pipeline performance data, pipeline traits, and application traits for the CD pipelines. Examples described herein may further acquire a query associated with at least one of performance criteria and application criteria, and indicate at least one pipeline trait of one of the CD pipelines whose pipeline characteristics satisfy the criteria of the query.

As such, examples described herein may provide a tool by which users may search for characteristics of existing CD pipelines that satisfy specified performance criteria, application criteria, or a combination thereof. In this manner, examples described herein may enable a user desiring to create a new CD pipeline for a particular computer application to find pipeline characteristics of CD pipelines previously created for similar applications and meeting desired performance criteria. In such examples, the user may then use that information to determine how to define the new CD pipeline for their particular computer application. In some examples, pipeline characteristics may be identified for multiple existing CD pipelines satisfying the query criteria may be identified, and pipeline characteristics common to the identified CD pipelines may be specified, which may further assist the user in appropriately defining the new CD pipeline. Other examples described herein may identify CD pipelines similar to a user's target CD pipeline and suggest changes that may improve the performance of the target CD pipeline. In this manner, examples described herein may analyze existing CD pipelines to provide insights that may assist a user in defining a new CD pipeline.

Referring now to the drawings, FIG. 1 is a block diagram of an example computing device 100 to identify pipeline trait(s) of a CD pipeline satisfying query criteria. As used herein, a "computing device" may be a desktop computer, notebook computer, workstation, tablet computer, mobile phone, smart device, server, blade enclosure, or any other processing device or equipment. In the example of FIG. 1, computing device 100 includes a processing resource 110 and a machine-readable storage medium 120 encoded with instructions 122, 124, and 128. In some examples, storage medium 120 may include additional instructions. In some examples, instructions 122, 124, and 128, and any other instructions described herein in relation to storage medium 120, may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

Figure 2:
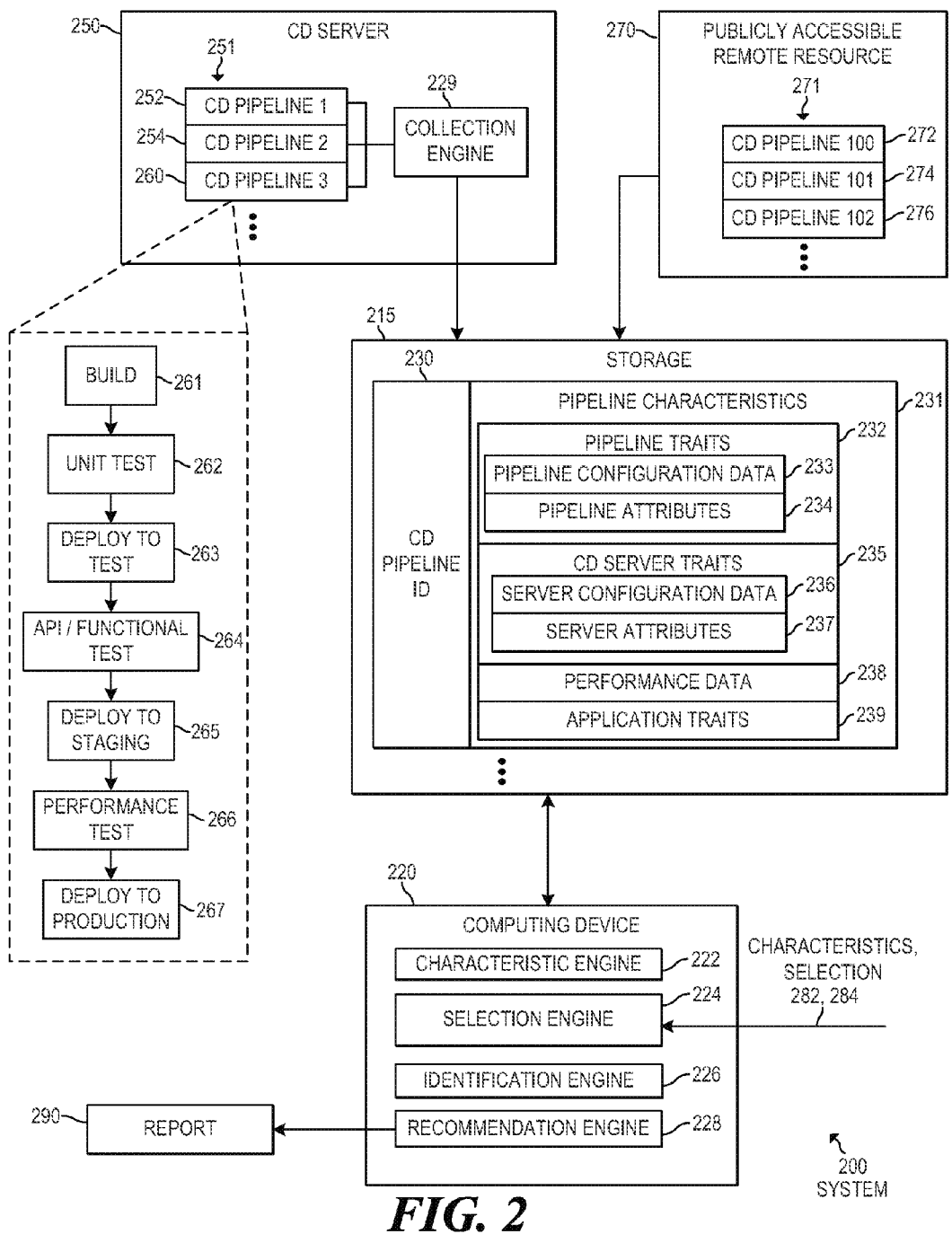
FIG. 2 is a block diagram of an example system to access pipeline characteristics for CD pipelines.

FIG. 2 is a block diagram of an example system 200 to access pipeline characteristics for CD pipelines. The example of FIG. 1 may be described herein with reference to example features illustrated in FIG. 2.

In the example of FIG. 1, computing device 100 may be in communication with at least one source of pipeline characteristics, such as at least one database or other storage storing pipeline characteristics. Computing device 100 may communicate with the storage via any suitable computer network. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network). In some examples, the storage may be implemented by at least one computer-readable storage medium, which may be remote from but accessible to computing device 100 (e.g., via a computer network). In some examples, at least a portion of the storage may be implemented on computing device 100.

In the example of FIG. 1, instructions 122 may access respective pipeline characteristics 180 for each of a plurality of CD pipelines. For example, instructions 122 may actively access (e.g., acquire, retrieve, etc.) or passively access (e.g., receive, etc.) the respectively pipeline characteristics 180 from the storage. In examples described herein, "pipeline characteristics" of a CD pipeline may include information about the CD pipeline, such as information specifying features of any of the CD pipeline itself, the implementation of the CD pipeline, the performance of the CD pipeline, or the like.

For example, pipeline characteristics for a CD pipeline may include pipeline traits, CD server traits, application traits, pipeline performance data, or a combination thereof. In examples described herein, "pipeline traits" for a CD pipeline include information about the CD pipeline itself, such as pipeline configuration data, pipeline attributes, or a combination thereof. In examples described herein, "pipeline configuration data" for a CD pipeline may be information regarding the configuration of any configurable aspect of the CD pipeline. In examples described herein, "pipeline attributes" for a CD pipeline may be information regarding features, behaviors, or other non-configurable qualities of the CD pipeline. Examples of pipeline traits are described herein in relation to example CD pipeline 260 illustrated in FIG. 2.

Pipeline configuration data for CD pipeline 260 may describe the configuration of any configurable aspect(s) of CD pipeline 260. For example, pipeline configuration data for CD pipeline 260 may describe any input(s) that are provided to CD pipeline 260. CD pipeline 260 may be defined to include a plurality of steps 261-267, and pipeline configuration data for CD pipeline 260 may describe data passed between particular steps. For example, the pipeline configuration data may indicate that assemblies built by build step 261 may be passed to unit test step 262. Additionally, each of steps 261-267 may have configurable aspects that may be described by the pipeline configuration data for CD pipeline 260, such as the input(s) to a step, the outputs of a step, which tool(s) or plugin(s) the step may execute or otherwise utilize, the input(s) to such utilized tool(s) or plugin(s), and the like. As an example, out of a plurality of different build automation tools available for building code into deliverable assemblies, build step 261 may be configured to run a first build automation tool of the plurality, and may be configured to pass, to the first build automation tool, specific arguments and environment variables that may cause the first build automation tool to execute differently than if other arguments and variables were passed. Pipeline configuration data for CD pipeline 260 may also indicate various scalar aspects of the CD pipeline (referred to herein as "scalar" pipeline configuration data), such as the number of steps in CD pipeline, the number of different tool(s) or plugin(s) utilized by the CD pipeline, the amount of testing done by the CD pipeline, the average number of test cases run by the CD pipeline, the number of users that have executed the CD pipeline, and the like.

Pipeline attributes of CD pipeline 260 may describe non-configurable qualities of CD pipeline 260. For example, pipeline attributes of CD pipeline 260 may include an identifier for the definition of CD pipeline 260, respective identifiers for each execution of CD pipeline 260, and the like. Pipeline attributes of CD pipeline 260 may include information describing various qualities of the CD pipeline, such as the purpose of the CD pipeline. For example, the purpose of CD pipeline 260 may be to build assemblies, to perform testing, to deliver an application into production, or the like.

In examples described herein, a CD pipeline may be executed at least partially by a CD server. In the example of FIG. 2, for example, CD pipeline 260 may be executed at least partially by CD server 250. In examples described herein, a CD server may be any suitable computing device for executing a CD pipeline independently or together with other computing device(s) (e.g., CD server(s)). As noted above, pipeline characteristics for a CD pipeline may include CD server traits for the CD pipeline.

In examples described herein, "CD server traits" for a CD pipeline may include information about at least one CD server to execute the CD pipeline, such as CD server configuration data, CD server attribute(s), or a combination thereof. In examples described herein, "CD server configuration data" for a CD pipeline may be information regarding the configuration of any configurable aspect of at least one CD server at least partially implementing the CD pipeline. Examples of CD server configuration data for a CD pipeline may include the total number of CD servers utilized to implement the CD pipeline, the relationships between the CD servers (e.g., master/slave, etc.), environment variables of a CD server, parameters of a CD server, settings of an operating system (OS), application, or database of a CD server, or the like.

In examples described herein, "CD server attributes" for a CD pipeline may be information regarding features, behaviors, or other qualities of at least one CD server at least partially implementing the CD pipeline. Examples of CD server attributes may include the type of the CD server, the type of OS utilized by the CD server, the version of the OS, dates of updates to the CD server, a list of plugin(s) available to the CD server, or the like.

In some examples, pipeline characteristics for a CD pipeline may include "application traits" indicating aspects of a computer application for which the CD pipeline is defined. In examples described herein, a "computer application" (which may be referred to herein as an "application") may be any system, component, program, website, web application, or any other type of software implemented in the form of executable instructions encoded on a machine-readable storage medium. In some examples, application traits may include application attributes, application configuration data, or a combination thereof.

Examples of application attributes include the programming language of the source code of the application, the size of the application (e.g., number of lines, number of files, etc.), the nature of the application (e.g., web server, client-server application, etc.), delivery schedule (e.g., delivered weekly, etc.), or the like. Examples of application configuration data may include data (e.g., parameters, etc.) affecting any the compiling of the application (e.g., whether to compile with or without optimization), the building of the application, the packaging of the application (e.g., whether to package or not), the testing of the application, the deployment of the application (e.g., whether to deploy or not), or the like.

In some examples, pipeline characteristics for a CD pipeline may include pipeline performance data for the CD pipeline, which may be data including performance measurements for each of one or more executions of the CD pipeline. Such pipeline performance data for a CD pipeline may include, for example, total execution time for the CD pipeline, the execution time(s) for individual step(s) of the CD pipeline, measure(s) of resource utilization (e.g., processor utilization, memory utilization, etc.) by respective executions of the CD pipeline, rate of failure, or the like. The pipeline performance data for a CD pipeline may include such performance data for each of a plurality of executions of the CD pipeline.

As described above, in the example of FIG. 1, instructions 122 may access respective pipeline characteristics 180 for each of a plurality of CD pipelines. In some examples, for each of the CD pipelines, the pipeline characteristics may include respective pipeline performance data, pipeline traits, and application traits for the CD pipeline. In such examples, respective pipeline performance data, pipeline traits, and application traits may comprise information previously collected by a collection engine of a CD server at least partially implementing the CD pipeline. Referring to an example illustrated in FIG. 2, for example, CD server 250 at least partially implements each of a plurality of CD pipelines 251, including at least CD pipelines 252, 254, and 260. In the example of FIG. 2, a collection engine 229 may collect pipeline characteristics for each of the CD pipelines, including respective pipeline performance data, pipeline traits, and application traits for CD pipeline 260, for example. In some examples, collection engine 229 may collect CD server traits for the CD pipeline 260 from CD server 250. Collection engine 229 is described in more detail below in relation to FIG. 2.

In the example of FIG. 1, instructions 124 may (actively or passively) acquire a query 182 associated with at least one of performance criteria and application criteria. In some examples, query 182 may be a search or other request to identify pipeline characteristic(s) of CD pipeline(s) satisfying the associated criteria. In examples described herein, the criteria "associated with" a query may be criteria acquired as part of the query, or may be derived from other information acquired as part of the query. In examples described herein, "performance criteria" may be any suitable standard(s) for judging pipeline performance data of CD pipelines and "application criteria" may be any suitable standard(s) for judging application traits of CD pipelines.

In some examples, the performance criteria may specify an absolute performance standard, such as a given execution time threshold or range for a CD pipeline or step(s) thereof. In other examples, the performance criteria may specify a relative performance standard, such as the top ten fastest CD pipelines. Application criteria may specify one or more application trait(s) to be satisfied by CD pipeline(s), such as programming language of the source code, a threshold application size (e.g., at least one million lines, etc.), or the like. In some examples, a query may be associated with both performance criteria and application criteria to be satisfied by CD pipeline(s).

In the example of FIG. 1, instructions 124 may acquire query 182 in any suitable manner. For example instructions 124 may receive query 182 input by a user. In some examples, the query 182 may be a free-form query entered by a user specifying performance criteria, application criteria, or a combination thereof, defined by the user. In other examples, instructions 124 may present a plurality of predefined queries to a user for selection. In such examples, instructions 124 may receive a user selection of one of the predefined queries as the query 182. As an example, the selected predefined query 182 may be a query for the top ten fastest CD pipelines for JAVA applications. In such examples, the performance criteria associated with the query may include the "top ten fastest" portion of the query, and the application criteria associated with the query may include the "JAVA applications" portion of the query.

In the example of FIG. 1, in response to the query, instructions 128 may identify at least one of the CD pipelines for which the criteria associated with query 182 is satisfied by the accessed pipeline characteristics 180 for the CD pipeline. For example, when query 182 include both performance and application criteria, instructions 128 may identify a given CD pipeline of the plurality of CD pipelines when the pipeline performance data for the given CD pipeline satisfies the associated performance criteria and the application traits for the given CD pipeline satisfy the associated application criteria. In examples in which query 182 includes exclusively performance criteria, instructions 128 may identify a given CD pipeline of the plurality of CD pipelines when the pipeline performance data for the given CD pipeline satisfies the associated performance criteria. In examples in which query 182 includes exclusively application criteria, instructions 128 may identify a given CD pipeline of the plurality of CD pipelines when the application traits for the given CD pipeline satisfy the associated application criteria.

In such examples, for each CD pipeline identified as satisfying the criteria associated with query 182, instructions 128 may indicate at least one pipeline trait for the identified CD pipeline. In such examples, in response to query 182, instructions 128 may indicate at least one accessed pipeline trait for a given one of the CD pipelines for which the at least one of the performance criteria and the application traits are satisfied by the pipeline performance data for the given CD pipeline and the application traits for the given CD pipeline, respectively. The pipeline trait(s) indicated by instructions 128 may comprise pipeline trait(s) accessed by instructions 122. In some examples, instructions 128 may indicate the pipeline trait(s) for the identified CD pipeline by displaying, reporting, or otherwise outputting the pipeline trait(s).

In some examples, in response to query 182, instructions 128 may identify multiple of the CD pipelines for which the at least one of the performance criteria and the application criteria are satisfied by at least one of the respective pipeline performance data and the respective application traits for each of the identified CD pipelines. In such examples, instructions 128 may output a report indicating, for each of the identified CD pipelines, at least one of the pipeline traits accessed by instructions 122. The report may have any suitable format, such as a list format, table format, spreadsheet format, or the like. By providing such an indication of pipeline traits of CD pipelines satisfying the query criteria, examples described herein may recommend pipeline traits that may be utilized to construct a CD pipeline potentially satisfying desired criteria.

In some examples, instructions 128 may specify in the report any pipeline traits common to each of the identified CD pipelines. Instructions 128 may specify the common pipeline traits in any suitable manner. In some examples, the pipeline traits accessed by instructions 122 may include pipeline configuration data and pipeline attribute(s) for each of the CD pipelines. In such examples, the common pipeline traits specified by instructions 122 may include at least one of common pipeline configuration data and common pipeline attribute(s). By specifying common pipeline traits, examples described herein may, for example, note pipeline traits potentially contributing to the identified CD pipelines having pipeline characteristic satisfying the criteria associated with query 182, such as the performance criteria. In some examples, instructions 128 may specify, in the report, any pipeline traits varying between the identified CD pipelines. For example, instructions 128 may specify pipeline traits varying between any two of the identified CD pipelines. By specifying varying pipeline traits, examples described herein may, for example, note pipeline traits unlikely to contribute to the identified CD pipelines having pipeline characteristic satisfying the criteria associated with query 182, such as the performance criteria.

In some examples, the pipeline characteristics 180 accessed by instructions 122 may include CD server traits for each of the CD pipelines. In such examples, the report output by instructions 128 may indicate, for each identified CD pipeline, at least one of a plurality of CD server traits for the CD server at least partially implementing the identified CD pipeline. For each identified CD pipeline, the plurality of CD server traits include at least one of CD server configuration data and CD server attributes for the CD server at least partially implementing the identified CD pipeline.

In some examples, computing device 100 may perform analytics on the plurality of CD pipelines to recommend changes to improve a target CD pipeline. In such examples, instructions 122 may access respective pipeline characteristics 180 for each of a plurality of CD pipelines, as described above. In some examples, instructions 122 may format the pipeline characteristics 180 for each of the CD pipelines into a vector of scalar and non-scalar pipeline characteristics. Example scalar pipeline characteristics may include pipeline performance data, scalar pipeline configuration data, as described above, or the like.

In such examples, instructions 124 may access a plurality of target pipeline characteristics for a target CD pipeline not included in the plurality of CD pipelines. As an example, the target CD pipeline may be a CD pipeline that a user of computing device 100 would like to improve. In some examples, a CD server implementing the target CD pipeline may comprise a collection engine (having functionality described herein in relation to collection engine 229 of FIG. 2) to collect target pipeline characteristics of the target CD pipeline. In such examples, instructions 124 may (actively or passively) acquire the target pipeline characteristics from the collection engine.

In some examples, instructions 124 may further acquire a query 182 specifying a selection of a scalar pipeline characteristic to be improved by a threshold amount for the target CD pipeline. For example, query 182 may specify a selection of performance data to be improved by a threshold amount for the target CD pipeline. As an example, query 182 may specify the total execution time of the target CD pipeline as the performance data to be improved, specify a decrease in the total execution time as the manner of improving the performance data, and specify that the total execution time is to be decreased by a threshold amount of 50%. In some examples, performance criteria associated with query 182 may be based on the selected performance data (i.e., the selected scalar pipeline characteristic) and threshold amount of improvement.

In such examples, instructions 128 may identify multiple of the CD pipelines whose pipeline characteristics satisfy a similarity metric relative to the target pipeline characteristics, and each of whose performance data over time includes a threshold amount of improvement in the selected scalar pipeline characteristic (such as selected performance data). For example, instructions 128 may calculate, for each of the CD pipelines, a trend for the selected scalar pipeline characteristic over time. As an example, when the selected scalar pipeline characteristic is total execution time, instructions 128 may calculate, for each of the CD pipelines, a trend for the total execution time of the CD pipeline as it has changed over time. Instructions 128 may calculate these trends for each of the CD pipelines based on the respective pipeline characteristics 180 accessed by instructions 122. Based on the calculated trends, instructions 128 may determine a subset of the CD pipelines for which the respective calculated trend includes the specified threshold amount of improvement (e.g., a decrease of 50%).

Of the determined subset of CD pipelines, instructions 128 may identify CD pipeline(s) whose pipeline characteristics satisfy a similarity metric relative to the target pipeline characteristics. In some examples, the similarity metric may be defined by or otherwise based on a clustering technique (or cluster analysis) applied to the accessed pipeline characteristics 180 of each of the identified subset of CD pipelines and the target pipeline characteristics. In such examples, CD pipelines placed into the same cluster as the target CD pipeline by the clustering technique based on the pipeline characteristics for the CD pipelines and the target CD pipelines, may be considered to have pipeline characteristics that satisfy the similarity metric relative to the target pipeline characteristics. The clustering technique may, for example, identify the CD pipelines of the subset whose pipeline characteristics 180 are sufficiently similar to the target pipeline characteristics relative to the pipeline characteristics 180 of other CD pipelines of the subset. In examples described herein, any suitable type of clustering technique or cluster analysis may be utilized.

In some examples, instructions 128 may indicate at least one accessed pipeline trait for at least one of the CD pipelines of the subset whose pipeline characteristics satisfy the similarity metric relative to the target pipeline characteristics. In this manner, instructions 128 may, in response to the query 182, indicate at least one accessed pipeline trait of a particular one of the CD pipelines for which a trend in the selected scalar pipeline characteristic includes a threshold amount of improvement (e.g., whose performance data for the particular CD pipeline satisfies the performance criteria) and for which the respective pipeline characteristics for the CD pipeline satisfy the similarity metric relative to the target pipeline characteristics. For example, instructions 128 may indicate at least one accessed pipeline trait of at least one CD pipeline that was included in the determined subset of CD pipelines and was clustered with the target CD pipeline based on the similarity between the respective pipeline characteristics 180 and the target pipeline characteristics.

In some examples, for each of the CD pipelines of the subset identified as similar to the target CD pipeline based on the similarity metric, instructions 128 may indicate a respective change in one of the pipeline traits of the CD pipeline that occurred within a target time period before the threshold improvement in the selected scalar pipeline characteristic (e.g., performance data). For example, the target time period may be any suitable time period, such as a day, a number of days, a number of hours, or the like. As an example, instructions 128 may indicate that a first build tool was replaced with a second build tool within the target time period (e.g., one day) before the threshold improvement in the selected scalar pipeline characteristic (e.g., the selected performance data). The change in the pipeline trait(s) may be indicated in any suitable manner. In some examples, the change may be indicated as a recommended change to improve the target CD pipeline.

In some examples, instructions 122, 124, and 128, may be part of an installation package that, when installed, may be executed by processing resource 110 to implement the functionalities described herein in relation to instructions 122, 124, and 128.

In such examples, storage medium 120 may be a portable medium, such as a CD, DVD, or flash drive, or a memory maintained by a server from which the installation package can be downloaded and installed. In other examples, instructions 122, 124, and 128 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-3. In some examples, instructions 122 may perform any functionalities described below in relation to engine 222 of FIG. 2, instructions 124 may perform any functionalities described below in relation to engines 224 and 226 of FIG. 2, and instructions 128 may perform any functionalities described below in relation to engine 228 of FIG. 2.

As noted above, FIG. 2 is a block diagram of an example system 200 to access pipeline characteristics for CD pipelines. In the example of FIG. 2, system 200 comprises a computing device 220 including engines 222, 224, 226, and 228. In some examples, computing device 220 may include additional engines.

Each of the engines of computing device 220 may be any combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement the engines of computing device 220. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry.

In some examples, the instructions can be part of an installation package that, when installed, can be executed by the processing resource to implement the engines of computing device 220. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a computing device including the processing resource. In such examples, the machine-readable storage medium may include memory such as a hard drive, solid state drive, or the like.

Computing device 220 of system 200 may be in communication with at least storage 215, which may be implemented by computing device 220 or at least one other computing device remote from but accessible to computing device 220. In some examples, storage 215 may be implemented by at least one machine-readable storage medium and may be accessible to computing device 220 via any suitable computer network, as described above in relation to FIG. 1.

In the example of FIG. 2, storage 215 is in communication with a CD server 250 and publicly accessible remote resource 270. CD server 250 may store respective definitions of a plurality of CD pipelines 251, including CD pipelines 252, 254, and 260, and may at least partially execute each of CD pipelines 251. In other examples, CD server 250 may store respective definitions of and at least partially execute more or fewer CD pipelines 251. CD server 250 may be any suitable computing device for at least partially executing CD pipelines 251. In some examples, system 200 may include storage 215, CD server 250, or a combination thereof.

In the example of FIG. 2, CD server 250 includes a collection engine 229, which may be any combination of hardware and programming to implement the functionalities described herein in relation to engine 229. For example, engine 229 may collect respective pipeline characteristics for each of CD pipelines 251 and provide (e.g., store) the respective pipeline characteristics in storage 215. In some examples, engine 229 may collect respective pipeline traits for each of CD pipelines 251. For example, for each of CD pipelines 251, engine 229 may collect the respective pipeline traits via an application programming interface (API)

providing access to the respective CD pipeline. In some examples, engine 229 may collect CD server traits for the CD pipelines 251 from CD server 250. Engine 229 may also collect respective performance data and respective application traits for the CD pipelines 251. In some examples, collection engine 229 may be implemented as a plurality of plugins to be executed on at least one processing resource of CD server 250, a first one of the plugins to collect pipeline traits when executed by a processing resource, and a second one of the plugins to collect CD server traits when executed. In some examples, in response to an indication that any pipeline characteristic for any of CD pipelines 251 has been added, modified, or removed, engine 229 may collect the added, modified, or removed configuration attribute from at least one of the CD pipeline of CD server. In some examples, system 200 may include collection engine 229.

In the example of FIG. 2, collection engine 229 may store collected pipeline characteristics for respective CD pipelines in storage 215 such that each of the pipelines characteristics for a given CD pipeline are associated in storage 215 with an identifier for the given CD pipeline. For example, FIG. 2 illustrates an example in which pipeline characteristics 231 for CD pipeline 260 are stored in storage 215 in associated with a CD pipeline identifier 230 for CD pipeline 260. In the example of FIG. 2, pipeline characteristics 231 for CD pipeline 260 include pipeline traits 232, CD server traits 235, pipeline performance data 238, and application traits 239. Pipeline traits 232 include pipeline configuration data 233 and pipeline attributes 234, and CD server traits 235 include CD server configuration data 236 and CD server attributes 237.

Storage 215 may store respective pipeline characteristics for a plurality of CD pipelines. For example, storage 215 may store respective pipeline characteristics for each of CD pipelines 251. In some examples, storage 215 may also store respective pipeline characteristics for other CD pipelines, such as pipeline characteristics for CD pipelines acquired from publicly accessible remote resource 270. Publicly accessible remote resource 270 may comprise at least one machine-readable storage medium storing definitions of CD pipelines 271 (including, for example, CD pipelines 272, 274, 276, etc.). In some examples publicly accessible remote resource 270 may further comprise a suitable computing device to at least partially implement CD pipelines 271. Resource 270 may be any publicly-accessible (e.g., via the Internet) repository of CD pipeline definitions and/or pipeline characteristics.

In the example of FIG. 2, a definition of an example CD pipeline 260 is illustrated. The definition of CD pipeline 260 includes a plurality of steps 261-267, each of which may be configured as described above in relation to FIG. 1. In such examples, the configuration of each of steps 261-267 may be represented by pipeline configuration data 233, as described above in relation to FIG. 1. In the example of FIG. 2, CD pipeline 260 may be defined to perform the following functionalities. A build step 261 may be defined to utilize external tool(s) or plugin(s) to build code into deliverable assemblies, which it may provide to step 262 for unit testing. After unit testing, step 262 may provide the assemblies to step 263, which may deploy the assemblies into a computing environment for API and/or functional testing by step 264. Step 265 may then deploy the assemblies to a staging environment, step 266 may perform performance testing on the assemblies, and then step 267 may deploy the assemblies to production. In other examples, CD pipeline 260 may include more steps, fewer steps, different steps, or a combination thereof. As described above, any of the steps may utilize at least one external tool or plugin to perform its functionalities, and may receive and/or utilize various parameters and variables, as described above. Such configuration information may be captured by pipeline configuration data 233, described above in relation to FIG. 1.

In the example of FIG. 2, a characteristic engine 222 may actively or passively access respective pipeline characteristics for each of a plurality of CD pipelines stored in storage 215. In such examples, the plurality of CD pipelines may include at least CD pipelines 251, and may further include other CD pipelines. In some examples, each collection of pipeline characteristics for a respective CD pipeline may include pipeline performance data and pipeline traits for the CD pipeline. In some examples, the pipeline performance data and pipeline traits for at least a given one of the CD pipelines may have been previously collected by collection engine 229 of CD server 250 at least partially implementing the given CD pipeline. In the example of FIG. 2, for example, pipeline characteristics 231 for CD pipeline 260 include pipeline performance data 238 and pipeline traits 232 previously collected by collection engine 229 and stored in storage 215 by collection engine 229. In some examples, the respective pipeline characteristics for each of the plurality of CD pipelines further include, for each of the CD pipelines, application traits for a computer application for which the CD pipeline is defined. In such examples, the application traits may be stored in storage 215 and previously collected by collection engine 229. In the example of FIG. 2, pipeline characteristics 231 for CD pipeline 260, for example, include application traits 239 previously collected and stored in storage 215 by collection engine 229. In some examples, the respective pipeline characteristics for each of the CD pipelines comprise CD server traits. In such examples, the CD server traits for a particular CD pipeline may include CD server configuration data and CD server attributes for a CD server at least partially implementing the CD pipeline. In the example of FIG. 2, pipeline characteristics 231 for CD pipeline 260, for example, include CD server traits 235 and CD server attributes 237 for CD server 250, which were previously collected and stored in storage 215 by collection engine 229.

In some examples, a selection engine 224 may actively or passively acquire target pipeline characteristics for a target CD pipeline and a selection of performance data to be improved by a threshold amount for the target CD pipeline. In the example of FIG. 2, engine 224 may acquire the target pipeline characteristics from a collection engine of a CD server at least partially implementing the target CD pipeline, as described above in relation to FIG. 1. In the example of FIG. 2, engine 224 may acquire the target pipeline characteristics via at least one communication 282. In some examples, engine 224 may acquire the selection of performance data to be improved by a threshold amount for the target CD pipeline via at least one communication 284 indicating the selected performance data and the threshold amount. In some examples, the communication(s) 284 may include information received as user input to a user interface (UI) implemented by computing device 220. Although the example of FIG. 2 is described herein in relation to an example in which certain performance data is selected for improvement for the target CD pipeline, in other examples, any scalar pipeline characteristic may be selected for the improvement, as described above.

Identification engine 226 to identify one of the plurality of CD pipelines whose pipeline characteristics satisfy a similarity metric relative to the target pipeline characteristics, and whose performance data over time includes the threshold amount of improvement in the selected performance data. In some examples, engine 226 may identify a subset of the plurality of CD pipelines whose performance data over time includes the threshold amount of improvement in the selected performance data, as described above. In such examples, engine 226 may further identify at least one of the subset of CD pipelines whose characteristics satisfy the similar metric relative to the target pipeline characteristics, where the similarity metric may be defined or otherwise based on a clustering technique (or cluster analysis), as described above in relation to FIG. 1.

In the example of FIG. 2, recommendation engine 228 may indicate, as a recommended change for improving the selected performance data of the target CD pipeline, a change in one of the pipeline traits of the identified CD pipeline that occurred within a target time period before the threshold improvement in the selected performance data for the identified CD pipeline.

In some examples, identification engine 226 may identify multiple of the CD pipelines whose pipeline characteristics satisfy a similarity metric relative to the target pipeline characteristics for the target CD pipeline, as described above, and whose performance data over time includes the threshold amount of improvement in the selected performance data. In such examples, recommendation engine 228 may indicate, for each of the identified CD pipelines, a change in one of the pipeline characteristics for the CD pipeline that occurred within a target time period before the threshold improvement for the identified CD pipeline. In some examples, engine 228 may further to output a report 290 indicating each of the respective changes in each of the identified CD pipelines as recommended changes for improving the performance of the target CD pipeline.

In some examples, identification engine 226 may identify multiple of the CD pipelines whose pipeline characteristics satisfy a similarity metric relative to the target pipeline characteristics, and whose performance data over time includes a threshold amount of decline in the selected performance data. In such examples, engine 228 may indicate, for each of the identified CD pipelines, a change in one of the pipeline characteristics for the CD pipeline that occurred within a target time period before the threshold decline for the CD pipeline. In such examples, recommendation engine 228 may output a report indicating each of the respective changes as associated with a negative change in the selected performance data. In such examples, the engine 228 may indicate changes in CD pipelines that occurred close in time to a degradation the selected performance data, rather than an improvement. In examples described herein, identification of such changes may function as a recommendation of what changes to avoid when desiring to improve the performance data (or other scalar pipeline characteristics).

As described above, collection engine 229 may collect the respective pipeline characteristics for the at least one of the CD pipelines whose pipeline characteristics are stored in storage 215. For example, collection engine 229 may collect the pipeline characteristics for each of CD pipelines 251 and store them in storage 215. In some examples, among the plurality of CD pipelines whose pipeline characteristics are accessed by engine 222, the respective pipeline characteristics for at least one of the CD pipelines may have been previously collected from publicly accessible remote resource 270 separate from CD server 250. In some examples, the pipeline characteristics acquired from resource 270 may include respective pipeline traits and pipeline performance data. As an example, the pipeline characteristics accessed by engine 222 may include respective pipeline characteristics for at least one of CD pipelines 271, the respective pipeline characteristics previously collected from publicly accessible remote resource 270.

Figure 3:
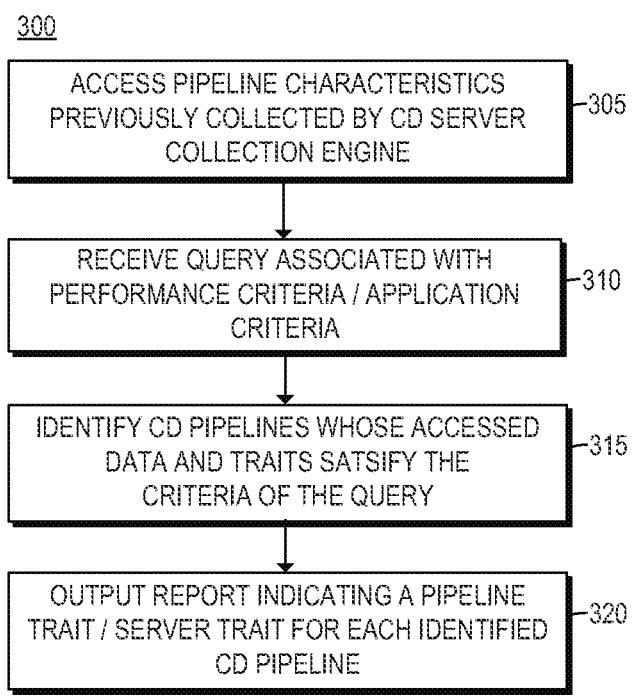
FIG. 3 is a flowchart of an example method for outputting a report indicating identified traits including at least one of pipeline trait(s) and CD server trait(s) for a CD pipeline.

In some examples, functionalities described herein in relation to FIG. 2 may be provided in combination with functionalities described herein in relation to any of FIGS. 1 and 3. In some examples, engine 222 may implement any of the functionalities described above in relation to instructions 122 of FIG. 1, engine 224 may implement any of the functionalities described above in relation to instructions 124 of FIG. 1, and either of engines 226 and 228 may implement any of the functionalities described above in relation to instructions 128 of FIG. 1.

FIG. 3 is a flowchart of an example method 300 for outputting a report indicating identified traits including at least one of pipeline trait(s) and CD server trait(s) for a CD pipeline. Although execution of method 300 is described below with reference to computing device 100 of FIG. 1 described above, other suitable systems for the execution of method 300 can be utilized (e.g., computing device 200). Additionally, implementation of method 300 is not limited to such examples.

At 305 of method 300, instructions 122 may access respective pipeline characteristics, for each of a plurality of CD pipelines, including pipeline traits, CD server traits, pipeline performance data, and application traits for the CD pipeline, each previously collected by a collection engine of a CD server at least partially implementing the CD pipelines. At 310, instructions 124 may receive a query 182 associated with at least one of performance criteria and application criteria.

At 315, in response to query 182, instructions 128 may identify multiple of the CD pipelines, each of whose accessed performance data and application traits satisfy the at least one of the performance criteria and the application traits of query 128. At 320, instructions 128 may output a report 290 indicating, for each of the identified CD pipelines, at least one of the accessed pipeline traits and the accessed CD server traits for the identified CD pipeline. In some examples, the report may indicates, for each of the identified CD pipelines, at least a portion of each of the accessed pipeline traits, the accessed CD server traits, and the accessed performance data for the identified CD pipeline.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2.

What is claimed is:
1. A non-transitory machine-readable storage medium comprising instructions executable by a processing resource to:
  access, for each of a plurality of continuous delivery (CD) pipelines, respective pipeline characteristics including respective pipeline performance data, pipeline traits, and application traits for the CD pipeline previously collected by a CD server, wherein the CD server is a computing device executing the CD pipeline independently or together with other computing devices, wherein, for each of the CD pipelines, the respective application traits indicate aspects of a computer application for which the CD pipeline is defined;
access a plurality of target pipeline characteristics for a target CD pipeline;
acquire a query specifying a selection of performance data to be improved by a threshold amount for the target CD pipeline;
in response to the query,
identify a subset of CD pipelines from the plurality of CD pipelines that satisfy the query based on the accessed pipeline characteristics of the plurality of CD pipelines;
compare the pipeline characteristics of the subset of the CD pipelines to a similarity metric associated with the target pipeline characteristics to identify a pipeline trait common to the subset of the CD pipelines; and
generate from the identified pipeline trait of the subset of the CD pipelines, a modification to the target CD pipeline to improve the performance data of the target CD pipeline by the threshold amount.

2. The storage medium of claim 1, wherein the instructions comprise instructions to:
output a report indicating the modification to the target CD pipeline.

3. The storage medium of claim 2, wherein the report further includes,
for each of the CD pipelines in the subset, pipeline configuration data and at least one pipeline attribute.

4. The storage medium of claim 2, wherein the report further includes
any pipeline traits varying between the CD pipelines in the subset.

5. The storage medium of claim 2, wherein:
the report indicates, for each CD pipeline in the subset, at least one of a plurality of CD server traits for a CD server at least partially implementing the CD pipeline, and
the plurality of CD server traits include at least one of CD server configuration data and CD server attributes for the CD server.

6. The storage medium of claim 1, wherein the modification comprises replacing a first build tool with a second build tool in the target CD pipeline to reduce execution time for generating an application according to the target CD pipeline.

7. The storage medium of claim 1, wherein the instructions to compare the pipeline characteristics of the subset of the CD pipelines comprise instructions to:
identify a CD pipeline of the subset having pipeline characteristics that are most similar to the target pipeline characteristics relative to the pipeline characteristics of other CD pipelines of the subset.

8. A system comprising:
at least one processor;
a non-transitory computer readable medium storing machine readable instructions, wherein the at least one processor is to execute the machine readable instructions to:
access, for each of a plurality of continuous delivery (CD) pipelines, respective pipeline characteristics including pipeline performance data and pipeline traits for the CD pipeline, the pipeline performance data and pipeline traits for at least a given one of the CD pipelines previously collected by a collection engine of a CD server, wherein the CD server is a computing device executing the given CD pipeline independently or together with other computing devices;
acquire target pipeline characteristics for a target CD pipeline;
execute a query specifying a selection of performance data to be improved by a threshold amount for the target CD pipeline;
in response to the query, identify a subset of the plurality of CD pipelines that satisfy the query based on the accessed pipeline characteristics of the plurality of CD pipelines;
compare the pipeline characteristics of the subset of the CD pipelines to a similarity metric associated with the target pipeline characteristics to identify a pipeline trait common to the subset of the CD pipelines;
generate from the identified pipeline trait of the subset of the CD pipelines, a modification to the target CD pipeline to improve the performance data of the target CD pipeline by the threshold amount
indicate, as a recommended change for improving performance of the target CD pipeline, the modification to the target CD pipeline.

9. The system of claim 8, wherein the respective pipeline characteristics for each of the plurality of CD pipelines include, for each of the CD pipelines, application traits for a computer application for which the CD pipeline is defined, the application traits previously collected.

10. The system of claim 8, wherein the at least one processor is to:
collect the respective pipeline characteristics for the at least one of the CD pipelines, the respective pipeline characteristics for each of the at least one of the CD pipelines comprising CD server traits, including CD server configuration data and CD server attributes for a CD server at least partially implementing the CD pipeline; and
for each of the at least one of the CD pipelines, collect the respective pipeline traits via an application programming interface (API) providing access to the CD pipeline.

11. The system of claim 8, wherein the at least one processor is to:
for at least a particular one the CD pipelines different than the given CD pipeline, access the respective pipeline characteristics for the particular CD pipeline, the respective pipeline characteristics including respective pipeline traits and pipeline performance data previously collected from publicly accessible remote resource separate from the CD server.

12. The system of claim 8, wherein the modification comprises replacing a first build tool with a second build tool in the target CD pipeline to reduce execution time for generating an application according to the target CD pipeline.

13. The system of claim 8, wherein the instructions to compare the pipeline characteristics of the subset of the CD pipelines comprise instructions to:
identify a CD pipeline of the subset having pipeline characteristics that are most similar to the target pipeline characteristics relative to the pipeline characteristics of other CD pipelines of the subset.

14. A method comprising:
accessing, for each of a plurality of continuous delivery (CD) pipelines, respective pipeline characteristics including pipeline traits, CD server traits, pipeline performance data, and application traits for the CD pipeline, each previously collected by a CD server, wherein the CD server is a computing device executing the CD pipelines independently or together with other computing devices, and for each of the CD pipelines, the respective application traits indicate aspects of a computer application for which the CD pipeline is defined;

accessing a plurality of target pipeline characteristics for a target CD pipeline;

receiving a query specifying a selection of performance data to be improved by a threshold amount for the target CD pipeline;

in response to the query, identifying a subset of CD pipelines from the plurality of CD pipelines that satisfy the query based on the accessed pipeline characteristics of the plurality of CD pipelines;

comparing the pipeline characteristics of the subset of the CD pipelines to a similarity metric associated with the target pipeline characteristics to identify a pipeline trait common to the subset of the CD pipelines;

generating from the identified pipeline trait of the subset of the CD pipelines, a modification to the target CD pipeline to improve the performance data of the target CD pipeline by the threshold amount; and outputting a report indicating the modification to the target CD pipeline.

15. The method of claim 14, wherein the report indicates, for each of the CD pipelines in the subset, at least a portion of each of the accessed pipeline traits, the accessed CD server traits, and the accessed performance data for the identified CD pipeline.

16. The method of claim 14, wherein the modification comprises replacing a first build tool with a second build tool in the target CD pipeline to reduce execution time for generating an application according to the target CD pipeline.

17. The method of claim 14, wherein comparing the pipeline characteristics of the subset comprises:

identifying a CD pipeline of the subset having pipeline characteristics that are most similar to the target pipeline characteristics relative to the pipeline characteristics of other CD pipelines of the subset.

* * * * *